United States Patent
Harikae et al.

(10) Patent No.: US 9,308,778 B2
(45) Date of Patent: Apr. 12, 2016

(54) PNEUMATIC RADIAL TIRE FOR USE ON PASSENGER CARS

(75) Inventors: Shinya Harikae, Hiratsuka (JP); Masatoshi Kuriyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 414 days.

(21) Appl. No.: 13/571,154

(22) Filed: Aug. 9, 2012

(65) Prior Publication Data

US 2013/0048185 A1 Feb. 28, 2013

(30) Foreign Application Priority Data

Aug. 24, 2011 (JP) .................................. 2011-182709

(51) Int. Cl.
*B60C 9/22* (2006.01)
*B60C 9/20* (2006.01)

(52) U.S. Cl.
CPC ............. *B60C 9/2006* (2013.04); *B60C 9/2204* (2013.04); *B60C 2009/2214* (2013.04); *B60C 2009/2223* (2013.04); *B60C 2009/2261* (2013.04); *B60C 2009/2266* (2013.04); *B60C 2009/2271* (2013.04)

(58) Field of Classification Search
CPC  B60C 9/2204; B60C 9/22; B60C 2009/2214; B60C 2009/2228; B60C 2009/2233; B60C 2009/2257; B60C 2009/2261; B60C 2009/2266; B60C 2009/2271
USPC .......................................... 152/527, 531, 533
See application file for complete search history.

(56) References Cited

U.S. PATENT DOCUMENTS

| | | | |
|---|---|---|---|
| 5,014,762 A * | 5/1991 | Beer et al. | |
| 5,396,941 A * | 3/1995 | Iuchi | 152/533 X |
| 6,520,232 B1 * | 2/2003 | Miyazaki et al. | 152/531 X |
| 6,926,053 B2 * | 8/2005 | Miyazaki et al. | 152/527 |
| 7,168,470 B2 * | 1/2007 | Yukawa et al. | 152/531 |
| 7,562,684 B2 * | 7/2009 | Nakagawa | 152/531 X |
| 7,934,527 B2 * | 5/2011 | Ikehara | 152/527 |
| 2004/0159393 A1 * | 8/2004 | Tanaka | |
| 2012/0006461 A1 * | 1/2012 | Oomiya | |
| 2013/0284337 A1 * | 10/2013 | Croissant | |

FOREIGN PATENT DOCUMENTS

| | | |
|---|---|---|
| JP | 06-024208 | 2/1994 |
| JP | 2005247069 A * | 9/2005 |
| JP | 2005247070 A * | 9/2005 |

(Continued)

OTHER PUBLICATIONS

English machine translation of JP 2010-264878 A, Nov. 25, 2010.*

(Continued)

*Primary Examiner* — Adrienne C Johnstone
(74) *Attorney, Agent, or Firm* — Thorpe North & Western

(57) ABSTRACT

A belt cover layer is provided on an outer circumferential side of a belt layer. The belt cover layer is constituted by a band-like member in which steel cords are embedded in rubber. Adjacent revolution portions of the band-like member are wound spirally in a tire circumferential direction so as not to contact each other in a region of at least 50% of a belt width centered on a tire equator. A load-strain curve of the steel cords has an inflection point in a strain region of 1% to 3.5%. An average elastic modulus when the steel cords are subjected to a load from 50 N to 100 N is from 25 GPa to 100 GPa.

14 Claims, 5 Drawing Sheets

(56) References Cited

FOREIGN PATENT DOCUMENTS

| JP | 2006130942 A | * | 5/2006 |
| JP | 2007069408 A | * | 3/2007 |
| JP | 2010264878 A | * | 11/2010 |

OTHER PUBLICATIONS

English machine translation of JP 2005-247069 A, Sep. 15, 2005.*
English machine translation of JP 2005-247070 A, Sep. 15, 2005.*
English machine translation of JP 2006-130942 A, May 25, 2006.*
English machine translation of JP 2007-069408 A, Mar. 22, 2007.*

* cited by examiner

PNEUMATIC RADIAL TIRE FOR USE ON PASSENGER CARS

PRIORITY CLAIM

Priority is claimed to Japan Patent Application Serial No. 2011-182709 filed on Aug. 24, 2011.

BACKGROUND

1. Technical Field

The present technology relates to a pneumatic radial tire for use on passenger cars, and particularly relates to a pneumatic radial tire for use on passenger cars by which steering stability when high-speed running can be enhanced and flat spot resistance performance can be improved.

2. Related Art

Generally, pneumatic radial tires for use on passenger cars have a structure in which a carcass layer, including a plurality of carcass cords oriented in a tire radial direction, is mounted between a pair of bead portions; a belt layer is disposed on an outer circumferential side of the carcass layer in a tread portion; and, furthermore, a belt cover layer is disposed on an outer circumferential side of the belt layer.

Conventionally, various organic fiber cords have been used as reinforcing cords of the belt cover layer. Particularly, nylon fiber cords have been widely used (e.g. see Japanese Unexamined Patent Application Publication No. H06-024208A). However, creep set strain of nylon fiber cords is great and, therefore, there is a problem that flat spots are prone to occur in pneumatic tires using such cords for the belt reinforcing layer.

Thus, consideration has been given to using steel cords in place of nylon fiber cords. However, there is a problem in that simply replacing nylon fiber cords with steel cords results in an excessive increase in rigidity of the belt cover layer, which leads to a decline in steering stability.

SUMMARY

The present technology provides a pneumatic radial tire for use on passenger cars in which a belt cover layer including steel cords is used, by which steering stability when high-speed running can be enhanced and flat spot resistance performance can be improved. A pneumatic radial tire for use on passenger cars of the present technology includes a tread portion extending in a tire circumferential direction to form an annular shape, a pair of side wall portions disposed on both sides of the tread portion, and a pair of bead portions disposed on inner sides in a tire radial direction of the side wall portions. A carcass layer is mounted between the pair of bead portions and a plurality of layers of a belt layer is disposed on an outer circumferential side of the carcass layer in the tread portion. In this pneumatic radial tire, a belt cover layer is provided on an outer circumferential side of the belt layer, the belt cover layer being constituted by a band-like member in which steel cords are embedded in rubber. Adjacent revolution portions of the band-like member are wound spirally in the tire circumferential direction so as not to contact each other in a region of at least 50% of a belt width centered on a tire equator. A load-strain curve of the steel cords has an inflection point in a strain region of 1% to 3.5%, and an average elastic modulus when the steel cords are subjected to a load from 50 N to 100 N is from 25 GPa to 100 GPa.

In the present technology, a belt cover layer is provided on an outer circumferential side of a belt layer, the belt cover layer being constituted by a band-like member in which steel cords are embedded in rubber. Adjacent revolution portions of the band-like member are wound spirally in a tire circumferential direction so as not to contact each other in a region of at least 50% or more of a belt width centered on a tire equator. As a result, the belt cover layer does not cover an entire surface of the belt layer and gaps are formed. Therefore, extreme increases in the rigidity of the belt cover layer can be prevented, the rigidity can be made appropriate, and steering stability can be enhanced. Additionally, members positioned more toward the tread surface side than the belt layer are reduced and, therefore, heat dissipation can be improved and build-up of heat in the tire can be suppressed. As a result, the flat spot resistance performance can be improved. Particularly, even though gaps are formed between the adjacent revolution portions of the band-like members, sufficient rigidity as a belt cover layer can be maintained and superior high-speed durability can be achieved because the load-strain curve has an inflection point in a strain region from 1% to 3.5%, and steel cords are used that have an average elastic modulus when subjected to a load from 50 N to 100 N of from 25 GPa to 100 GPa.

In the present technology, a region is preferably provided where the adjacent revolution portions of the band-like member are wound spirally in the circumferential direction so as to contact or overlap each other at both end portions in a tire width direction of the belt cover layer. As a result, the rigidity of the end portions in the tire width direction of the belt cover layer can be effectively increased, and the flat spot resistance performance and the steering stability can be further improved.

Here, the belt cover layer is preferably formed by continuously winding a single band-like member spirally in the tire circumferential direction. By continuously forming a region where the band-like member contacts or overlaps and a region where the band-like member does not contact using a single band-like member as described above, end portion rigidity of the belt cover layer can be further increased and the flat spot resistance performance can be improved. Additionally, as a result, productivity and uniformity can be improved.

In the present technology, a product of a cross-sectional area of steel filaments constituting the steel cords and a cord density of the steel cords with respect to the band-like member is preferably from 0.8 mm$^2$/cm to 2.0 mm$^2$/cm, and the cord density of the steel cords with respect to the band-like member is preferably from 5 cords/cm to 10 cords/cm. As a result, the rigidity of the belt cover layer can be made appropriate and the steering stability can be further enhanced.

In the present technology, a width of the band-like member is preferably not less than 4 mm and not more than 12 mm, and a pitch between the adjacent revolution portions of the band-like member is preferably from 0.5 times to 1.5 times the width of the band-like member. As a result, the steering stability and the flat spot resistance performance can be improved and stress concentration at the terminal portions of the band-like member can be avoided and, therefore durability can be improved.

In the present technology, an incline direction with respect to the tire equator of the band-like member and an incline direction with respect to the tire equator of belt cords of a belt layer, of the plurality of layers of the belt layer, that is adjacent to the belt cover layer are preferably the same. As a result, heat build-up can be suppressed and the flat spot resistance performance can be improved.

In the present technology, the belt cords constituting the belt layer are preferably monofilament steel cords. As a result, heat build-up in the belt layer is further suppressed and, therefore, the flat spot resistance performance can be improved.

Note that the average elastic modulus when subjected to a load of 50 N to 100 N is determined from the slant of a straight line obtained by joining a 50 N load point and a 100 N load point of a load-strain curve.

DETAILED DESCRIPTION

Detailed descriptions will be given below of a configuration of the present technology with reference to the accompanying drawings.

Figure 1:
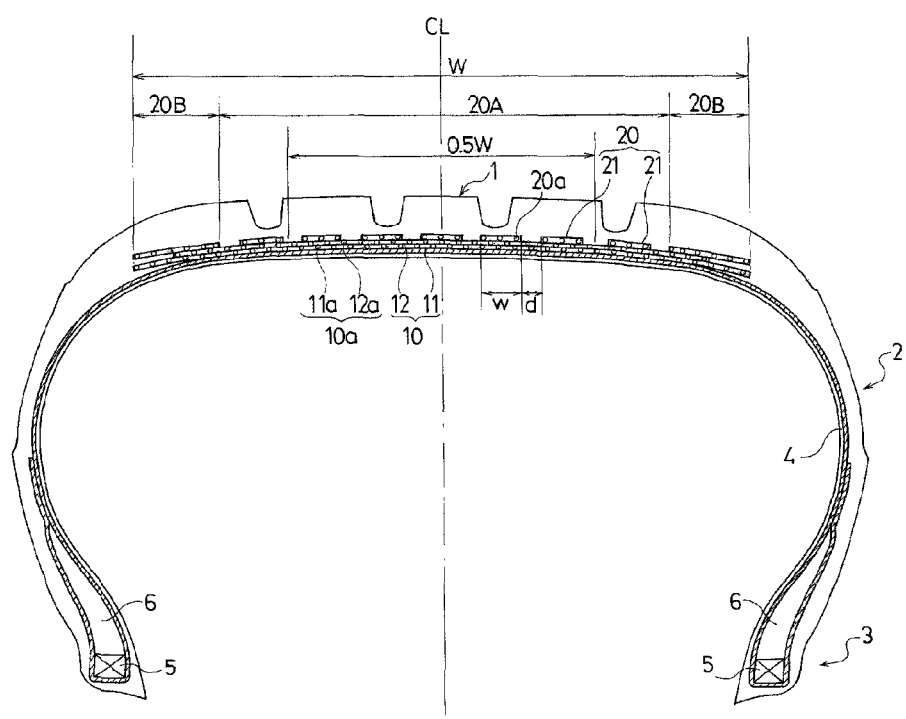
FIG. 1 is a meridian cross-sectional view of a pneumatic radial tire for use on passenger cars according to an embodiment of the present technology.
Figure 2:
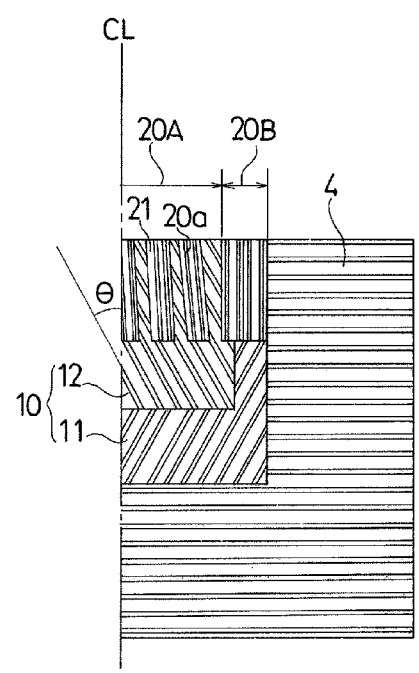
FIG. 2 is a main constituent expanded view in which a carcass layer, a belt layer, and a belt cover layer of the pneumatic radial tire for use on passenger cars depicted in FIG. 1 are extracted and illustrated.

FIG. 1 illustrates a pneumatic radial tire for use on passenger cars according to an embodiment of the present technology (hereinafter referred to as the "tire"). Additionally, FIG. 2 is an expanded drawing (illustrating only one side from a tire equatorial plane CL) in which a carcass layer 4 and a belt layer 10 of the tire of FIG. 1 are extracted and illustrated.

In FIG. 1, 1 is a tread portion; 2 is a side wall portion; and 3 is a bead portion. The tread portion 1 extends in a tire circumferential direction to form an annular shape. The side wall portion 2 is disposed on both sides of the tread portion 1. Furthermore, the bead portion 3 is disposed on an inner side in a tire radial direction of the side wall portion 2. The carcass layer 4 is mounted between the left-right pair of bead portions 3,3. The carcass layer 4 includes a plurality of reinforcing cords extending in the tire radial direction, and is folded back around a bead core 5 disposed in each of the bead portions 3 from a tire inner side to a tire outer side. Additionally, a bead filler 6 is disposed on a periphery of the bead core 5, and the bead filler 6 is enveloped by a main body part and the folded over part of the carcass layer 4.

On the other hand, two layers of the belt layer 10 (11 and 12) including steel cords are disposed throughout an entirety of a circumference of the tire on the outer circumferential side of the carcass layer 4 in the tread portion 1. As illustrated in FIG. 2, belt cords 10a (11a and 12a) constituting the belt layer 10 (11 and 12) are inclined with respect to the tire circumferential direction, and an inclination angle θ thereof is from 15° to 40°. Additionally, these belt cords 11a and 12a are disposed so as to cross each other. Note that provided that a plurality of layers is disposed, the belt layer 10 is not limited to the two layer belt layer illustrated in FIG. 2.

Furthermore, a belt cover layer 20 is provided on an outer circumferential side of the belt layer 10. The belt cover layer 20 is formed from a band-like member 21 in which steel cords are embedded in rubber. Also, adjacent revolution portions of the band-like member 21 are wound spirally in a tire circumferential direction so as not to contact each other in a region of at least 50% of a belt width W centered on a tire equator CL.

Thus, the belt cover layer 20 does not cover an entire surface of the belt layer 10 and gaps are formed. Therefore, extreme increases in the rigidity of the belt cover layer 20 can be prevented, the rigidity can be made appropriate, and the steering stability can be enhanced. Additionally, compared to cases where a conventional full cover layer is provided such as that illustrated in FIG. 5, members positioned more toward the tread surface side than the belt layer 10 are reduced because the belt cover layer 20 does not cover the entire surface of the belt layer 10. Therefore, heat dissipation can be improved and build-up of heat in the tire can be suppressed. As a result, the flat spot resistance performance can be improved.

Note that in cases where the width of the belt layer 10 of which a plurality is provided varies, the adjacent revolution portions of the band-like member 21 are wound spirally in the tire circumferential direction so as not to contact each other in a region that is at least 50% of the belt width W of the belt layer having the greatest width centered on the tire equator CL (the belt layer 11 in FIG. 1).

Figure 3:
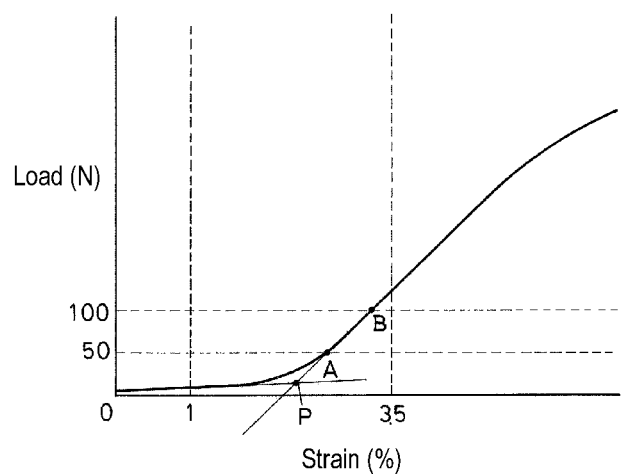
FIG. 3 is a graph showing a load-strain curve of steel cords constituting the belt cover layer of the present technology.

Here, steel cords for which a load-strain curve has an inflection point P in a strain region from 1% to 3.5%, and for which an average elastic modulus when subjected to a load from 50 N to 100 N is from 25 GPa to 100 GPa such as 65 GPa to 100 GPa, as shown in FIG. 3, are used as the steel cords 20a that constitute the belt cover layer 20. In other words, as shown in the load-strain curve of FIG. 3, the steel cords 20a are configured so that the load-strain curve has an inflection point P where the amount of strain (shown on the horizontal axis) is from 1% to 3.5%. Here, the "inflection point P" is an intersection of an extended line of a straight line portion of the 0.2 to 0.5% strain region and an extended line of a straight line portion of the 50 to 100 N load region in a load-strain curve where measurement is performed under a state of 5 N initial load (point where strain is zero). Additionally, the average elastic modulus, determined from the inclination of a straight line joining a point A where the load is 50 N and a point B where the load is 100 N (on the vertical axis), is configured to be from 25 GPa to 100 GPa. By using such steel cords, even though gaps are formed between the adjacent revolution portions of the band-like members 21 as described above, sufficient rigidity as the belt cover layer 20 can be imparted and superior high-speed durability can be achieved.

In cases where the position of the inflection point on the load-strain curve exists in a strain region that is less than 1%, manufacture of the belt cover layer 20 will be difficult. In cases where the position of the inflection point on the load-strain curve exists in a strain region that is greater than 3.5%, high-speed durability will be insufficient. Additionally, if the average elastic modulus under a load from 50 N to 100 N is less than 25 GPa, belt rigidity will be excessively low, the steering stability will decline, and deformation in a ground contact portion generated when flat spots are formed cannot be sufficiently suppressed, thus leading to a decline in the flat spot resistance performance. If the average elastic modulus under a load from 50 N to 100 N is greater than 100 GPa, behavior will be similar to that displayed when a conventional full cover layer is provided, and effects of improving the steering stability and the flat spot resistance performance cannot be obtained.

Examples of methods for providing the inflection point in the load-strain curve include using steel cords with an m×n structure or using steel cords where a twisted wire is preformed so as to have a planar waveform or a spiral waveform as the steel cords 20a that constitute the belt cover layer 20.

Such steel cords will elongate by twisting at initial periods of deformation in order to follow deformation. Furthermore, after the amount of elongation allowable via twisting of the cords is exhausted, the elastic modulus of the material itself will be exerted. As a result, an inflection point will appear in the load-strain curve.

Figure 4A:
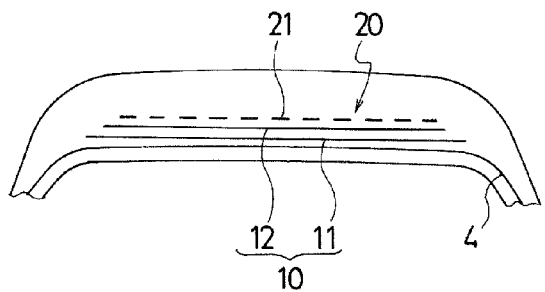
FIGS. 4A to 4C are schematic views illustrating the cross-sectional shape of a tread portion of the pneumatic radial tire for use on passenger cars of the present technology.
Figure 4B:
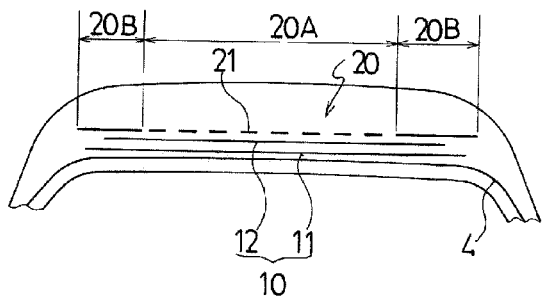
Figure 4C:
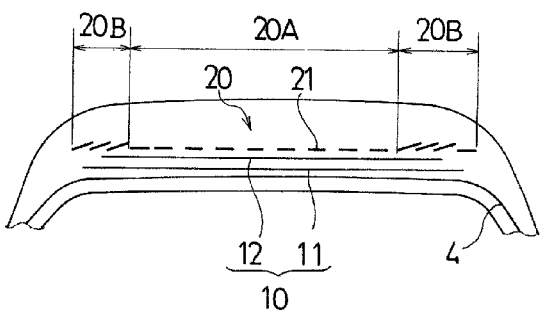

In the present technology, the band-like member 21 may be formed such that the adjacent revolution portions are wound spirally in the circumferential direction without contacting each other throughout all regions of the belt cover layer 20, as illustrated in FIG. 4A. However, preferably, a region 20B is provided at both end portions in the tire width direction of the belt cover layer 20 where the adjacent revolution portions of the band-like member 21 contact each other, as illustrated in FIG. 4B. Alternatively, preferably, a region 20B is provided at both end portions in the tire width direction of the belt cover layer 20 where the adjacent revolution portions of the band-like member 21 overlap, as illustrated in FIG. 4C. Thus, because the adjacent revolution portions of the band-like member 21 contact or overlap each other at both end portions in the tire width direction of the belt cover layer 20, the rigidity of both end portions in the width direction of the belt cover layer 20 can be effectively increased, and the flat spot resistance performance and the steering stability can be further enhanced. Note that in the region 20B where contacting or overlapping occurs, provided that a portion of the adjacent revolution portions of the band-like member 21 contacts or overlaps, an entirety thereof need not contact or overlap.

In cases where such a region 20B where the adjacent revolution portions of the band-like member 21 contact or overlap is provided, it is sufficient that at least two revolution portions wound in the circumferential direction from both end portions in the longitudinal direction of the band-like member 21 contact or overlap. Conversely, a sum of widths of the region 20B where the adjacent revolution portions of the band-like member 21 contact or overlap is preferably not more than 40% of the belt width W. If the sum of the widths of the region 20B where the adjacent revolution portions of the band-like member 21 contact or overlap exceeds 40% of the belt width W, a region 20A where the band-like member 21 is wound so as not to contact will be excessively small, and the rigidity of the belt cover layer 20 cannot be made appropriate.

Different band-like members 21 may be used to individually form the region 20A where the band-like member 21 is wound so as not to contact and the region 20B where the band-like member 21 is wound so as to contact or overlap. However, preferably, the regions 20A and 20B are formed by spirally winding a single band-like member 21 continuously in the circumferential direction. By forming the belt cover layer 20 continuously using a single band-like member 21 as described above, the end portion rigidity of the belt cover layer 20 can be more effectively increased and the flat spot resistance performance can be further improved. Additionally, productivity and uniformity can be enhanced.

In the present technology, a product of a cross-sectional area of steel filaments constituting the steel cords 20a that constitute the belt cover layer 20 and a cord density of the steel cords 20a with respect to the band-like member 21 is preferably from 0.8 mm$^2$/cm to 2.0 mm$^2$/cm. By configuring the steel cords 20a as described above, the steering stability can be further improved. Here, a cord density of the steel cords 20a with respect to the band-like member 21 is preferably from 5 cords/cm to 10 cords/cm.

If the product of the cross-sectional area and the cord density is less than 0.8 mm$^2$/cm, the rigidity of the belt cover layer 20 cannot be sufficiently enhanced and the steering stability will decline. Additionally, if the product of the cross-sectional area and the cord density exceeds 2.0 mm$^2$/cm, the rigidity of the belt cover layer 20 will increase excessively and the steering stability will decline. Likewise, if the cord density of the steel cords 20a is less than 5 cords/cm, the rigidity of the belt cover layer 20 cannot be sufficiently enhanced and the steering stability will decline. Additionally, if the cord density of the steel cords 20a exceeds 10 cords/cm, the rigidity of the belt cover layer 20 will increase excessively and the steering stability will decline.

In the present technology, a width w of the band-like member 21 is preferably not less than 4 mm and not more than 12 mm. By configuring the width w of the band-like member 21 in this way, stress concentration at the terminal portions of the band-like member 21 can be avoided and, therefore, durability of the band-like member 21 can be enhanced. Additionally, a pitch d between the adjacent revolution portions of the band-like member 21 is preferably from 0.5 times to 1.5 times the width w of the band-like member 21. By configuring the pitch d of the band-like member 21 in this way, the steering stability and the flat spot resistance performance can be further improved.

Here, if the width w of the band-like member 21 is less than 4 mm, the number of revolutions will increase and manufacturing efficiency will decline. If the width w of the band-like member 21 exceeds 12 mm, difference levels of rigidity at the end portions will increase and durability will decrease. Moreover, if the pitch d of the band-like member 21 is less than 0.5 times the width w of the band-like member 21, the rigidity of the belt cover layer 20 will be excessively high, an unbalance in rigidity will occur, and the steering stability will decline. Additionally, members more to the tread surface side than the belt layer 10 will increase and, as a result, temperature increases will not be able to be sufficiently suppressed and the flat spot resistance performance will not be able to be sufficiently improved. If the pitch d of the band-like member 21 exceeds 1.5 times the width w of the band-like member 21, the rigidity of the belt cover layer 20 will be excessively low, an unbalance in rigidity will occur, and the steering stability will decline.

In the present technology, the band-like member 21 is wound so that the revolution portions thereof do not contact each other. Therefore, the inclination angle of the steel cords 20a constituting the belt cover layer 20 tends to be larger than in cases where the band-like member 21 is wound so as to contact. On the other hand, the steel cords 20a are used for the belt cover layer 20 and, therefore, interlayer shearing strain between the belt cover layer 20 and the belt layer 12 contacting the belt cover layer 20 tends to be great. Thus, as illustrated in FIG. 2, an incline direction with respect to the tire equator CL of the band-like member 21 and an incline direction with respect to the tire equator CL of the belt layer 12 that is adjacent to the belt cover layer 20 are preferably the same. By disposing the belt layer 12 and the belt cover layer 20 in this way, heat build-up can be suppressed and the flat spot resistance performance can be improved.

In the present technology, the material of the belt cords 10a constituting the belt layer 10 is not particularly limited, but preferably monofilament steel cords are used as the belt cords 10a constituting the belt layer 10. Monofilament steel cords are used without twisting steel filaments together, and a characteristic thereof is an absence of energy loss caused by fretting (rubbing) between filaments, which occurs in twisted wires. Therefore, by using such monofilament steel cords for the belt layer 10, heat build-up in the belt layer 10 can be suppressed and the flat spot resistance performance can be further improved.

Working Examples

Eighteen test tires for Comparative Examples 1 to 4 and Working Examples 1 to 14 were fabricated. Each test tire was a pneumatic tire having a tire size of 205/55R16 and the fundamental tire structure illustrated in FIG. 1. Each of the form, width with respect to the belt width, sum of widths of contacting or overlapping regions with respect to the width of the belt cover layer, and band-like member winding method for the belt cover layer; inflection point, average elastic modulus, structure, cross-sectional area, cord count, total cross-sectional area, and incline direction with respect to the adjacent belt layer for the steel cords constituting the belt cover layer; and, furthermore, the structure of the belt layer was varied as shown in Tables 1 and 2.

Note that in the belt layers of each of the 18 types of test tires of Comparative Examples 1 to 4 and Working Examples 1 to 14, the inclination angle of the belt cords with respect to the tire circumferential direction was 27°, the cord volume was equivalent, and the widths of the belt layers in order from the tire inner surface side were 180 mm and 170 mm.

These 18 types of test tires were evaluated for flat spot resistance performance and steering stability according to the evaluation methods described below and the results thereof were recorded in Tables 1 and 2.

Flat Spot Resistance Performance

Each test tire was assembled on a rim having a rim size of 16×6.5 JJ and, thereafter, inflated to an air pressure of 220 kPa. Then, using an indoor drum test machine (drum diameter: 1,707 mm), uniformity (RFV) was measured in accordance with JASO C607. Additionally, the drum was stopped after pre-running each tire on the drum for 30 minutes at a speed of 150 km/hr, and each tire was loaded with a load (4.85 kN) and allowed to sit for one hour in this loaded state. Thereafter, uniformity (RFV) was measured again, and the difference between the uniformity (RFV) values before and after the pre-running was evaluated and indexed. The evaluation results were indexed, the inverse of the result of Comparative Example 1 being assigned an index value of 100. Larger index values indicate superior flat spot resistance performance.

Steering Stability

Each test tire was assembled on a rim having a rim size of 16×6.5 JJ, inflated to an air pressure of 220 kPa, mounted on a test vehicle, and subjected to a sensory evaluation by five test drivers on a test course. The results were scored using a 5-point method with Comparative Example 1 being assigned a score of 3. Larger scores indicate superior steering stability.

TABLE 1

Figure 5:
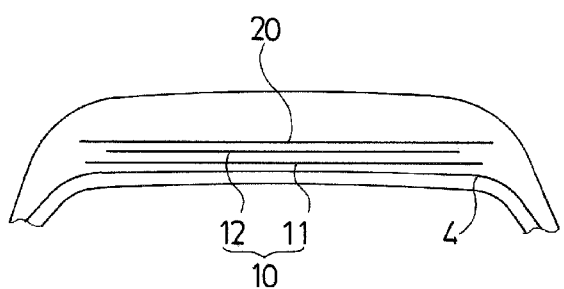
FIG. 5 is a schematic view illustrating the cross-sectional shape of the tread portion of a conventional pneumatic radial tire for use on passenger cars.

| | | Comparative Example 1 | Working Example 1 | Working Example 2 | Working Example 3 |
|---|---|---|---|---|---|
| Belt cover layer | Form | FIG. 5 | FIG. 4A | FIG. 4A | FIG. 4A |
| | Width with respect to belt width (%) | 100 | 100 | 80 | 50 |
| | Sum of widths of contacting or overlapping regions with respect to the width of the belt cover layer (%) | 100 | — | — | — |
| | Band-like member winding method | Continuous | Continuous | Continuous | Continuous |
| Belt cover cords | Inflection point (%) | 3.0 | 3.0 | 3.0 | 3.0 |
| | Average elastic modulus (GPa) | 75 | 75 | 75 | 75 |
| | Structure | 5 × 4 × 0.11 | 5 × 4 × 0.11 | 5 × 4 × 0.11 | 5 × 4 × 0.11 |
| | Cross-sectional area (mm$^2$) | 0.190 | 0.190 | 0.190 | 0.190 |
| | Cord count (cords/cm) | 7 | 7 | 7 | 7 |
| | Total cross-sectional area (mm$^2$/cm) | 1.33 | 1.33 | 1.33 | 1.33 |
| | Incline direction with respect to the belt layer | Reverse | Reverse | Reverse | Reverse |
| Belt cords structure | | 2 + 2 × 0.25 | 2 + 2 × 0.25 | 2 + 2 × 0.25 | 2 + 2 × 0.25 |
| Flat spot resistance performance (Index) | | 100 | 105 | 102 | 100 |
| Steering stability | | 3 | 3.3 | 3.3 | 3.2 |

| | | Comparative Example 2 | Comparative Example 3 | Working Example 4 | Working Example 5 | Comparative Example 4 |
|---|---|---|---|---|---|---|
| Belt cover layer | Form | FIG. 4A | FIG. 4A | FIG. 4A | FIG. 4A | FIG. 4A |
| | Width with respect to belt width (%) | 30 | 90 | 90 | 90 | 90 |
| | Sum of widths of contacting or overlapping regions with respect to the width of the belt cover layer (%) | — | — | — | — | — |
| | Band-like member winding method | Continuous | Continuous | Continuous | Continuous | Continuous |
| Belt cover cords | Inflection point (%) | 3.0 | 3.0 | 3.0 | 3.0 | 3.0 |
| | Average elastic modulus (GPa) | 75 | 15 | 25 | 100 | 125 |
| | Structure | 5 × 4 × 0.11 | 5 × 4 × 0.11 | 5 × 4 × 0.11 | 5 × 4 × 0.11 | 5 × 4 × 0.11 |
| | Cross-sectional area (mm$^2$) | 0.190 | 0.190 | 0.190 | 0.190 | 0.190 |
| | Cord count (cords/cm) | 7 | 7 | 7 | 7 | 7 |
| | Total cross-sectional area (mm$^2$/cm) | 1.33 | 1.33 | 1.33 | 1.33 | 1.33 |
| | Incline direction with respect to the belt layer | Reverse | Reverse | Reverse | Reverse | Reverse |

TABLE 1-continued

| Belt cords structure | 2 + 2 × 0.25 | 2 + 2 × 0.25 | 2 + 2 × 0.25 | 2 + 2 × 0.25 | 2 + 2 × 0.25 |
|---|---|---|---|---|---|
| Flat spot resistance performance (Index) | 95 | 95 | 105 | 105 | 100 |
| Steering stability | 2.8 | 2.8 | 3.3 | 3.3 | 3 |

TABLE 2

| | | Working Example 6 | Working Example 7 | Working Example 8 | Working Example 9 |
|---|---|---|---|---|---|
| Belt cover layer | Form | FIG. 4B | FIG. 4B | FIG. 4C | FIG. 4B |
| | Width with respect to belt width (%) | 100 | 100 | 100 | 100 |
| | Sum of widths of contacting or overlapping regions with respect to the width of the belt cover layer (%) | 30 | 30 | 30 | 30 |
| | Band-like member winding method | Discontinuous | Continuous | Continuous | Continuous |
| Belt cover cords | Inflection point (%) | 3.0 | 3.0 | 3.0 | 3.0 |
| | Average elastic modulus (GPa) | 75 | 75 | 75 | 75 |
| | Structure | 5 × 4 × 0.11 | 5 × 4 × 0.11 | 5 × 4 × 0.11 | 5 × 4 × 0.11 |
| | Cross-sectional area (mm$^2$) | 0.190 | 0.190 | 0.190 | 0.190 |
| | Cord count (cords/cm) | 7 | 7 | 7 | 4 |
| | Total cross-sectional area (mm$^2$/cm) | 1.33 | 1.33 | 1.33 | 0.76 |
| | Incline direction with respect to the belt layer | Reverse | Reverse | Reverse | Reverse |
| | Belt cords structure | 2 + 2 × 0.25 | 2 + 2 × 0.25 | 2 + 2 × 0.25 | 2 + 2 × 0.25 |
| Flat spot resistance performance (Index) | | 110 | 115 | 120 | 110 |
| Steering stability | | 3.5 | 3.5 | 3.5 | 3.3 |

| | | Working Example 10 | Working Example 11 | Working Example 12 | Working Example 13 | Working Example 14 |
|---|---|---|---|---|---|---|
| Belt cover layer | Form | FIG. 4B | FIG. 4B | FIG. 4B | FIG. 4B | FIG. 4B |
| | Width with respect to belt width (%) | 100 | 100 | 100 | 100 | 100 |
| | Sum of widths of contacting or overlapping regions with respect to the width of the belt cover layer (%) | 30 | 30 | 30 | 30 | 30 |
| | Band-like member winding method | Continuous | Continuous | Continuous | Continuous | Continuous |
| Belt cover cords | Inflection point (%) | 3.0 | 3.0 | 3.0 | 3.0 | 3.0 |
| | Average elastic modulus (GPa) | 75 | 75 | 75 | 75 | 75 |
| | Structure | 5 × 4 × 0.11 | 5 × 4 × 0.11 | 5 × 4 × 0.11 | 5 × 4 × 0.11 | 5 × 4 × 0.11 |
| | Cross-sectional area (mm$^2$) | 0.190 | 0.190 | 0.190 | 0.190 | 0.190 |
| | Cord count (cords/cm) | 5 | 10 | 12 | 7 | 7 |
| | Total cross-sectional area (mm$^2$/cm) | 0.95 | 1.90 | 2.28 | 1.33 | 1.33 |
| | Incline direction with respect to the belt layer | Reverse | Reverse | Reverse | Same | Reverse |
| | Belt cords structure | 2 + 2 × 0.25 | 2 + 2 × 0.25 | 2 + 2 × 0.25 | 2 + 2 × 0.25 | 1 + 1 × 0.40 |
| Flat spot resistance performance (Index) | | 115 | 115 | 115 | 118 | 125 |
| Steering stability | | 3.5 | 3.5 | 3.3 | 3.5 | 3.5 |

It is clear from Tables 1 and 2 that compared to Comparative Example 1, which had a belt cover layer in which gaps were not formed between the adjacent revolution portions of the band-like members, each of Working Examples 1 to 14 achieved both superior flat spot resistance performance and steering stability.

On the other hand, it was not possible to improve the flat spot resistance performance and the steering stability with each of Comparative Example 2, where the width of the belt cover layer was small, and Comparative Examples 3 and 4, where the average elastic modulus of the belt cover cords constituting the belt cover layer was outside that prescribed in the present technology.

What is claimed is:

1. A pneumatic radial tire for use on passenger cars comprising a tread portion extending in a tire circumferential direction to form an annular shape, a pair of side wall portions disposed on both sides of the tread portion, and a pair of bead portions disposed on inner sides in a tire radial direction of the side wall portions; a carcass layer being mounted between the pair of bead portions and a plurality of layers of a belt layer being disposed on an outer circumferential side of the carcass layer in the tread portion; wherein a belt cover layer is provided on an outer circumferential side of the belt layer, the belt cover layer being constituted by a band member in which steel cords are embedded in rubber, adjacent revolution portions of the band member are wound spirally in the tire circumferential direction so as not to contact each other in a region of at least 50% of a belt width centered on a tire equator, a load-strain curve of the steel cords has an inflection point in a strain region of 1% to 3.5%, and an average elastic modulus when the steel cords are subjected to a load from 50 N to 100 N is from 65 GPa to 100 GPa, a cord density of the steel cords with respect to the band member is from 5 cords/cm to 10 cords/cm, adjacent revolution portions of the band member are wound spirally in the tire circumferential direction so as to contact each other at a region at both end portions in the tire width direction of the belt cover layer, and a pitch d between the adjacent revolution portions of the band member in a central region between the end portion regions is 0.5 times to 1.5 times a width of the band member.

2. The pneumatic radial tire for use on passenger cars according to claim 1, wherein the belt cover layer is formed by continuously winding a single band member spirally in the tire circumferential direction.

3. The pneumatic radial tire for use on passenger cars according to claim 1, wherein an incline direction with respect to the tire equator of the band member and an incline direction with respect to the tire equator of belt cords of a belt layer, of the plurality of layers of the belt layer, that is adjacent to the belt cover layer are the same.

4. The pneumatic radial tire for use on passenger cars according to claim 1, wherein the belt cords constituting the belt layer are monofilament steel cords.

5. The pneumatic radial tire for use on passenger cars according to claim 1, wherein a sum of widths of the region where the adjacent revolution portions of the band member contact is not more than 40% of the belt width.

6. The pneumatic radial tire for use on passenger cars according to claim 1, wherein a width of the band member is not less than 4 mm and not more than 12 mm.

7. The pneumatic radial tire for use on passenger cars according to claim 1, wherein a product of a cross-sectional area of steel filaments constituting the steel cords and a cord density of the steel cords with respect to the band member is from 0.8 mm$^2$/cm to 2.0 mm$^2$/cm.

8. The pneumatic radial tire for use on passenger cars according to claim 1, wherein a width of the band member is not less than 4 mm and not more than 12 mm.

9. A pneumatic radial tire for use on passenger cars, comprising a tread portion extending in a tire circumferential direction to form an annular shape, a pair of side wall portions disposed on both sides of the tread portion, and a pair of bead portions disposed on inner sides in a tire radial direction of the side wall portions; a carcass layer being mounted between the pair of bead portions and a plurality of layers of a belt layer being disposed on an outer circumferential side of the carcass layer in the tread portion; wherein a belt cover layer is provided on an outer circumferential side of the belt layer, the belt cover layer being constituted by a band member in which steel cords are embedded in rubber, adjacent revolution portions of the band member are wound spirally in the tire circumferential direction so as not to contact each other in a region of at least 50% of a belt width centered on a tire equator, a load-strain curve of the steel cords has an inflection point in a strain region of 1% to 3.5%, and an average elastic modulus when the steel cords are subjected to a load from 50 N to 100 N is from 65 GPa to 100 GPa, a cord density of the steel cords with respect to the band member is from 5 cords/cm to 10 cords/cm, adjacent revolution portions of the band member are wound spirally in the tire circumferential direction so as to overlap at a region at both end portions in the tire width direction of the belt cover layer, and a pitch d between the adjacent revolution portions of the band member in a central region between the end portion regions is 0.5 times to 1.5 times the width of the band member.

10. The pneumatic radial tire for use on passenger cars according to claim 9, wherein a sum of widths of the region where the adjacent revolution portions of the band member overlap is not more than 40% of the belt width.

11. The pneumatic radial tire for use on passenger cars according to claim 9, wherein the belt cover layer is formed by continuously winding a single band member spirally in the circumferential direction.

12. The pneumatic radial tire for use on passenger cars according to claim 9, wherein an incline direction with respect to the tire equator of the band member and an incline direction with respect to the tire equator of belt cords of a belt layer, of the plurality of layers of the belt layer, that is adjacent to the belt cover layer are the same.

13. The pneumatic radial tire for use on passenger cars according to claim 9, wherein the belt cords constituting the belt layer are monofilament steel cords.

14. The pneumatic radial tire for use on passenger cars according to claim 9, wherein a product of a cross-sectional area of steel filaments constituting the steel cords and a cord density of the steel cords with respect to the band member is from 0.8 mm$^2$/cm to 2.0 mm$^2$/cm.

* * * * *